United States Patent [19]
Abe et al.

[11] 3,974,869
[45] Aug. 17, 1976

[54] FLUID FLOW CONTROL VALVE

[76] Inventors: Michio Abe, 2-119 Mino-cho, Kasugai, Aichi; Tomio Urokohara, 4-15 Yasiu-cho, Kita, Nagoya, both of Japan

[22] Filed: Nov. 4, 1974

[21] Appl. No.: 520,780

Related U.S. Application Data
[63] Continuation of Ser. No. 350,095, April 11, 1973, abandoned.

[30] Foreign Application Priority Data
Apr. 13, 1972 Japan.................................. 47-37260

[52] U.S. Cl................................ 251/309; 137/375; 251/310; 251/315; 251/317; 251/368
[51] Int. Cl.²....................... F16K 5/02; F16K 5/06
[58] Field of Search ........... 137/375; 251/183, 192, 251/193, 181, 170, 171, 309–317, 368, 304

[56] References Cited
UNITED STATES PATENTS

| | | | |
|---|---|---|---|
| 2,776,104 | 1/1957 | Sinkler................................ | 251/192 |
| 2,845,248 | 7/1958 | Fuglie................................ | 251/317 |
| 3,066,909 | 12/1962 | Reed, Jr............................. | 251/317 |
| 3,090,594 | 5/1963 | Floyd................................. | 251/183 |
| 3,167,086 | 1/1965 | Michalski........................... | 251/317 |
| 3,192,943 | 7/1965 | Moen.................................. | 251/192 |
| 3,223,111 | 12/1965 | Anderson........................... | 251/315 |
| 3,256,910 | 6/1966 | Cupp.................................. | 251/310 |
| 3,370,335 | 2/1968 | Freed.................................. | 251/309 |
| 3,392,748 | 7/1968 | Geyer.................................. | 251/183 |
| 3,498,317 | 3/1970 | Duffey................................ | 137/375 |

*Primary Examiner*—William R. Cline
*Assistant Examiner*—H. Jay Spiegel
*Attorney, Agent, or Firm*—Hill, Gross, Simpson, Van Santen, Steadman, Chiara & Simpson

[57] ABSTRACT

Fluid flow control valves such as plug valves or cocks have the plugs thereof supported and sealed in the valve housing by a rigid but somewhat elastic plastics bearing member which is preloaded and compressed from its free state condition and seeks to reclaim this condition for taking up wear and preventing leakage in the valve assembly. The bearing member is preferably stretched over the plug and compressed in the housing by a retainer which is pressed into one end of the housing.

7 Claims, 6 Drawing Figures

FLUID FLOW CONTROL VALVE

This is a continuation of application Ser. No. 350,095, filed Apr. 11, 1973, now abandoned.

FIELD OF THE INVENTION

This invention relates to improvements in plug valves or cocks for controlling the flow of fluids and particularly relates to a valve cock with a housing having an open end and a plurality of ports, a plug in the housing controlling flow between the ports, a rigid but resilient plastics bearing enveloping the plug and having passages communicating with the ports, and a retainer in the open end of the housing preloading the plastics bearing so that it will take up wear and prevent leakage.

PRIOR ART

Heretofore, plug valves or cocks required accurate fitting of the plug in the housing to prevent leakage. Fine finishes were needed on the plug periphery and the wall of the housing bore receiving the plug. Lapping and honing operations were used to produce such finishes and these were time consuming and costly. To provide for wear take up, the plugs and bores of the housing receiving the plugs were tapered and wear take up means such as springs or screws were provided to urge the tapered plug to the small end of the tapered bore frequently causing the plug to seize in the bore. Packings were also used to stop leakage. The plugs and housings were formed of metal and there was a tendency for vibration and fluid hammering action between the plug and its housing because of the required metal to metal bearing engagement between the plug and housing resulting in leakage and wear.

SUMMARY OF THIS INVENTION

This invention now avoids the heretofore required expensive fine finished plugs and housings in plug valves or cocks, eliminates metal to metal contact between the plug and its housing, damps out vibrations, and provides wear take up without additional take up means or seals. In accordance with this invention a plastics bearing is preloaded between the plug and its housing to firmly support the plug and at the same time provide a complete seal for the valve. The plastics material used for this bearing has a low coefficient of friction, a high wear resistance, and while it is rigid, it does possess a degree of elasticity and compressability so that when it is preloaded it will attempt to reclaim its free state condition and in so doing, automatically take up wear and maintain the valve parts in tightly sealed relationship.

Suitable plastics materials for the plug bearings and seals of this invention are high density linear ethylene copolymers, synthetic rubbers and the like. Specific examples of such plastics materials are high density ethylene copolymers manufactured and sold by Phillips Chemical Company under the trade name "Marlex", "Alathon" manufactured by Du Pont Company, and "Fortiflex" manufactured and sold by Celanese Plastics Company. These plastics materials are rigid or stiff but are compressible and resilient to reclaim their free state size and shape when compression loads thereon are relieved. When compressed, they have untimed stresses which are released to take up wear and keep the plug and its housing in sealed relation.

A feature of the invention is the provision of valve housing with an open end through which the plug and bearing are inserted receiving a retainer bottomed on the bearing and pressed into the housing to any depth required for developing a predetermined preload on the bearing. A lip on the end of the housing is then spun over the retainer to hold it at this depth.

The free state inner dimensions of the bearing are less than the outside dimensions of the plug so that insertion of the plug in the bearing will stretch the bearing. The dimensions of the outside of the stretched bearing with the plug therein are greater than the inside dimensions of the housing receiving the plug and bearing assembly so that when the assembly is pressed into the housing, the bearing will be not only axially loaded but also circumferentially compressed. Further, the housing is preferably tapered inwardly from its open end receiving the plug and bearing assembly and the bearing may also be tapered to provide a better circumferential compression and radial loading under the axial load imparted by the retainer pressed into the housing.

The housing, of course, has a plurality of ports for fluid flow, the plug has ports for selectively communicating with the housing ports and the bearing has passageways joining the plug and housing ports.

The plug and its bearing may take any desired shape such as a cylinder, a cone, a sphere, or the like since the bearing can be molded to conform with any plug and housing shape and when preloaded, is effective to tightly embrace any plug shape.

It is then an object of this invention to provide a plug valve with a plastics bearing between the plug and valve housing which is under a preload to maintain a seal for the valve components and to expand to take up wear of the components.

A further object of the invention is to eliminate the heretofore required fine finishes for valve cocks with a preloaded plastics bearing.

Another object of the invention is to provide a plug valve with a plastics bearing stretched over the plug and compressed in the valve housing to sealingly engage both the plug and the housing and provide passages between the ports of the plug and housing.

Another object of the invention is to provide an inexpensive valve cock with rough finished plug and housing components separated by a preloaded plastics bearing of low friction plastics material.

A specific object of the invention is to provide a plug valve with a metal housing having ports and an open end, a metal plug having ports for selectively communicating with the housing ports, a molded plastics bearing stretched over the plug and a retainer bottomed on the bearing pressed into the open end of the housing to a depth for developing a desired preload on the bearing.

Other and further objects of this invention will become apparent to those skilled in this art from the following detailed description of the annexed sheets of drawings, which by way of preferred examples, illustrate two embodiments of the invention.

BRIEF DESCRIPTION OF THE PREFERRED EMBODIMENTS

Figure 1:
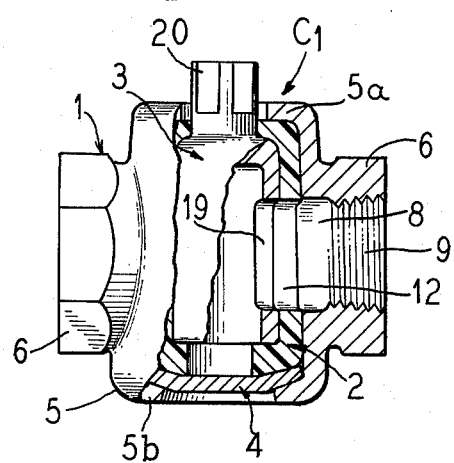
FIG. 1 is a side elevational view, with a portion broken away and shown in vertical section of a two way cock embodying the invention.
Figure 2:
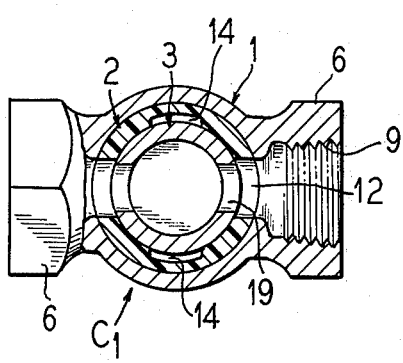
FIG. 2 is a plan view, with a portion broken away in horizontal section of the cock of FIG. 1.
Figure 3:
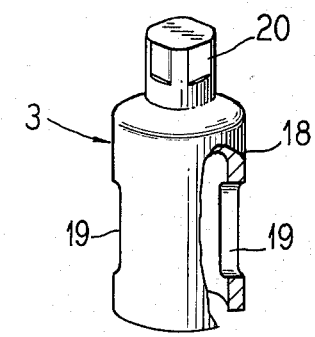
FIG. 3 is an exploded perspective view of the components of the cock of FIGS. 1 and 2 with portions broken away and shown in vertical section.
Figure 3:
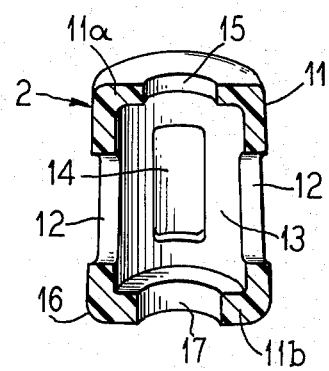
Figure 3:
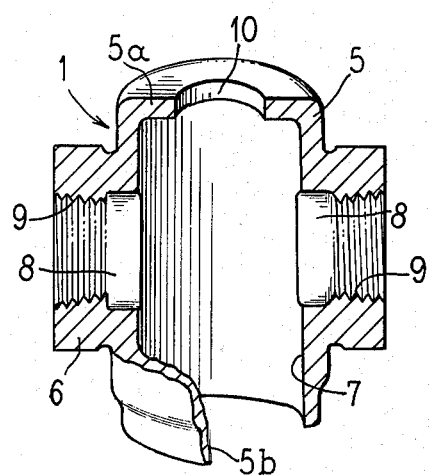
Figure 3:

In FIGS. 1 to 3, the two way cock $C_1$ is composed of a metal housing 1, a plastics bearing tube 2 fixed in said housing in sealed engagement, a metal plug 3 tightly and rotatably seated in said bearing tube and a closure plate 4 pressed into the bottom of the housing 1.

The housing 1 is preferably cast of non-ferrous metal such as a copper alloy and has a generally tubular shaped main body portion 5 with laterally extending hexagonal bosses 6 on opposite sides of the body 5. The body has a tapered bore 7 extending from an open bottom end to an end wall 5a. A thin annular wall portion 5b surrounds the large open end at the bottom of the bore 7 for a purpose to be further described.

A pair of diametrically opposed ports 8 are provided in the tubular housing portion connecting the bore 7 with tapered threaded holes 9 inside the bosses 6. These threaded holes 9 of course receive pipes, tubing or the like conveying fluid which may be either gaseous or liquid to and from the cock $C_1$. The end wall 5a of the housing has a central circular hole 10 therethrough.

The plastics bearing tube 2 has a tubular main body portion 11, preferably tapered the same as the housing bore 7. End walls 11a and 11b are provided on the ends of the tubular body 11 and a pair of diametrically opposite ports 12, 12 are formed through the side wall of the tubular body between these end walls 11a and 11b.

The tubular body 11 has a cylindrical inner wall 13 with diametrically opposite slot recesses 14 mid-way between the ports 12, 12 for a purpose to be hereinafter described.

A circular hole 15 is formed through the axial center of the end wall 11a of the tubular body 11.

The cylindrical side wall of the tubular body 11 is merged into the bottom wall 11b by a rounded bearing surface corner 16 for a purpose to be more fully described. A circular hole 17 is formed through the center of this bottom wall 11b.

The tubular body 11 has a slightly larger diameter than the conical bore 7 of the housing 1 or at least is stretched to a larger diameter than this housing bore when it receives the plug 3.

The plug 3 is preferably a cold formed non-ferrous metal member such as a copper alloy. The plug has a cylindrical plug body 18 of larger diameter than the inside wall 13 of the tubular bearing 2 and diametrically opposite ports 19 are formed through this cylindrical body 18 to selectively register the bearing ports 12, 12 and recesses 14, 14. The cylindrical plug body 18 is open at one end and closed at the other end with a substantially square shaft portion 20 projecting therefrom.

In assembling the cock $C_1$ the plug 3 is forced through the hole 17 of the bearing tube 2 expanding the hole to permit insertion and the shaft portion 20 of the plug projects through the hole 15 of the tube. The ports 19 of the plug are aligned to selectively register with the ports 12 and recesses 14 of the bearing tube. Since the plug has an external dimension greater than the free state inner dimension of the tube, the tube is stretched by the plug and the plug will tightly fit in the tube.

The subassembly of the tube 2 and plug 3 are then inserted through the open bottom end of the housing 1 and forced into the conical bore 7 of the housing until the end wall 11a of the tube is bottomed against the end wall 5a of the housing. The shaft 20 projects freely through the hole 10 and this end wall 5a. The ports 12 of the tube are aligned with the ports 8 of the housing. Then the dished metal closure plate 4 which can also be composed of the same copper alloy as the housing is inserted in the open end of the housing and pressed against the bearing surface 16 of the tube surrounding the end wall 11b. The closure disk 4, as shown in FIG. 1, embraces the bearing portion 16 and overlies the bottom wall 11b. The disk is pressed into the housing to a depth sufficient for maintaining a desired preload on the plastics bearing tube 2 and then the thin portion 5b of the housing is spun over the periphery of the disk to form a retaining lip which will lock the disk in the housing at the depth for maintaining the desired preload on the tube 2.

Since the plastics bearing tube 2 has elastic properties and is loaded axially by the closure disk 4 and also radially by the bore 7 of the housing and is further squeezed radially by the dished portion of the disk acting on the bearing surface 16 at the end of the tube body 11, the bearing which has previously been stretched over the plug 3 is deformed from its free state and has internal stresses which tend to regain this free state condition. The thus preloaded bearing will maintain the plug 2 in tight fitting relation therein and of course will have a tight fitting relationship with the housing.

The housing 1 need not be finished and may be in the form of a rough casing with its conical wall 7 being rough and biting into the surfaces of the tubular body portion 11 to form a tight sealed fixed relationship therebetween. Further since the bearing is somewhat resilient the finish of the plug 3 need not be accurate because the bearing will accommodate irregularities. The plug does have somewhat of a finish on the periphery of the tubular portion 18 so that it will rotate in the tube 2.

FIGS. 1 and 2 illustrate the "opened" condition of the cock $C_1$ so that fluids may flow from one threaded hole 9 of a boss 6 into the plug 3 through the ports 8, 12, and 19 and then flow out of the other boss. When the plug 3 is rotated 90° by means of the shaft portion 20 in either direction, the ports 19 will be moved from registry with the ports 12 and the cock will be closed. In this closed condition the relief recesses 14 in the tube 2 register with the ports 19 so that the plastics material of the tube will not bulge into the ports 19 under the preload exerted on the plastics material and form projections which could be scratched off of the internal surface of the bearing tube 2 when the plug is again rotated. Thus, the relief portions 14 register with the ports 19 of the plug in the closed position of the cock and eliminate possible damage to the bearing tube.

It should be understood, of course, that the two way cock $C_1$ of FIGS. 1 to 3 could be modified to provide a three way cock by addition of ports and passages for that purpose. Further, an angle cock could be obtained by providing an opening in the closure plate 4.

Figure 4:
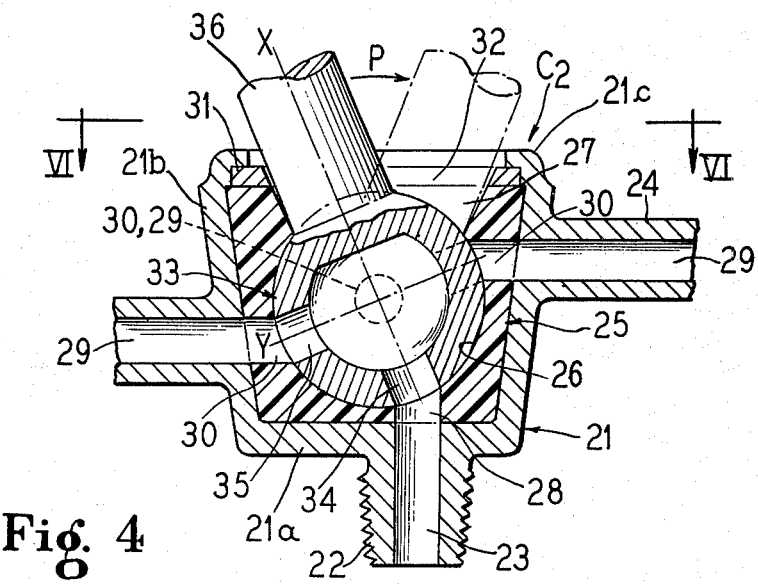
FIG. 4 is a vertical sectional view with a portion in elevation, of a multiple-way cock of this invention.
Figure 5:
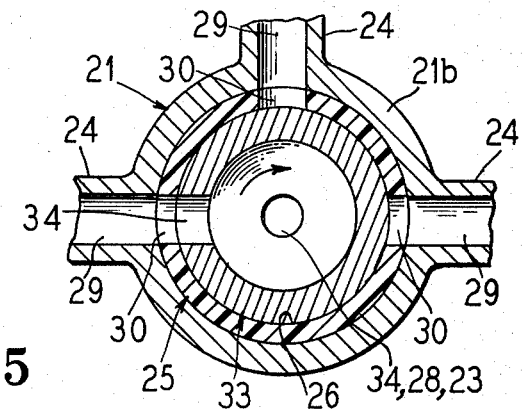
FIG. 5 is a horizontal sectional view of the cock along the line Y of FIG. 4.
Figure 6:
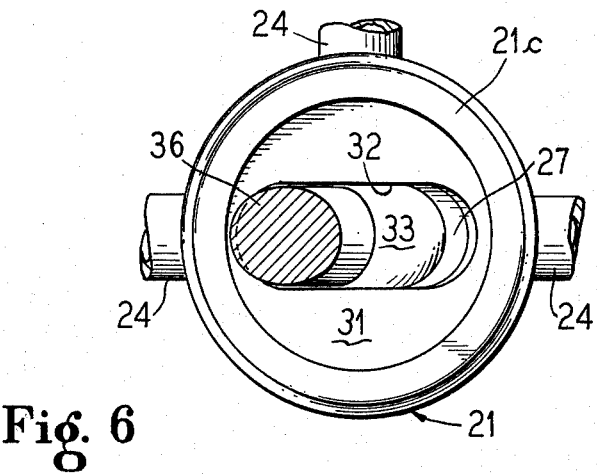
FIG. 6 is a plan view along the line VI—VI of FIG. 4.

FIGS. 4 and 5 illustrate a multi-way ball cock $C_2$ of this invention and it will be understood that the materials for the components of this ball cock are the same as those used in the hereinabove described two way cock $C_1$.

As shown in FIGS. 4 and 5, a frusto-conical metal housing 21 has a large opening at its upper end and tapers therefrom to a bottom end wall 21a with an externally threaded depending nipple 22 having an inlet passage 23 therethrough. Three outlet nipples 24 project from the side wall 21b of the housing 22 in the indicated positions. These outlet nipples 24 are aligned on the line Y shown in FIG. 4 for a purpose to be more fully hereinafter described.

A frusto-conical plastics bearing tube or body 25 is pressed fitted into the housing 21 and has an internal spherical bearing wall 26 opening outwardly and radially toward the upper end of the housing at a rather narrow slot-shaped opening 27.

An inlet passage 28 is provided in the bottom of the bearing 25.

The outlet nipples 24 have flow passages 29 therethrough registering with passages 30 in the side wall of the bearing 25.

A metal closure plate 31 is bottomed on the top of the plastics bearing tube or body 25 and pressed thereagainst to preload the bearing in the tapered bore of the housing for developing a desired compression load on the bearing. The plate 31 is held in the housing by spinning over an annular wall portion 21c at the top end of the housing to form a fold or lip overlying the periphery of the plate. The plate 31 has a slot 32 registering with the slot 27 of the bearing tube 25.

A hollow spherical plug 33 is pressed into the recess of the bearing tube 25 and is larger than this recess to stretch the bearing tube. The spherical plug 33 has an outlet port 34 provided on the line X shown in FIG. 4 to register with the inlet passage 28 of the bearing 25. In addition, an outlet port 35 is provided in the hollow plug 33 on the line Y so as to register with any of the outlet ports 30 of the bearing 25.

A shank 36 projects from the spherical plug 33 through the slots 27 and 32 to provide an operating lever for the cock.

Since the cock $C_2$ of FIGS. 4 and 5 is composed of the housing 21, the bearing tube 25, and the plug 33, corresponding with the housing, bearing tube and plug parts of the cock $C_1$ of FIGS. 1 to 3 and the bearing tube 25 is inserted between the housing 21 and plug 33 in the same stretched and compressed manner as described in connection with FIGS. 1 to 3, it will be understood that the cock $C_2$ maintains the good sealed relationship of the plug and housing as well as the wear take up capacity as described in connection with the cock $C_1$.

The cock $C_2$ is illustrated in FIGS. 4 and 5 in its opened position where fluid is supplied into the plug 33 through the inlet passage 23 and ports 28 and 34 and then flows to the lefthand side outlet nipple 24 through the ports 35 and 30. Then when the lever 36 is rotated 90° or 180° on the line X, the outlet 35 of the plug 33 registers with the other outlets respectively to flow the fluid through such outlets.

The cock $C_2$ is closed by tilting the lever 36 approximately 45° in the direction shown by the arrow P in FIG. 4 whereupon the spherical plug 33 will turn to close the inlet 28 and the outlet 30 by changing the positions of the ports 34 and 35 of the plug 33 along the imaginary line Y.

It will be noted that the cocks of this invention have a multiple layer cylinder construction with compressed elastic material with a stored internal stress between the metal cylinders. In such constructions, shock caused by a quick change of fluid pressure through the cocks will be relieved.

It will be understood that the invention provides a simple, sturdy construction relieving shock loads on cock valves, having low friction operating characteristics, wear take up, and prolonged sealing capacity without the air of heretofore required packings and the like. The heretofore required fine finishes for the metal components have been completely avoided.

We claim as our invention:

1. A four component fluid flow control valve which comprises a rigid housing having an open end, a closed end and a plurality of housing ports, a rigid plug having a hollow portion in said housing with plug ports for selectively joining the hollow portion thereof with the housing ports and a shaft portion extending from the hollow portion out of the housing, a rigid but stretchable and resilient one piece hollow plastics bearing stretched around the hollow portion of said plug into mating relation therewith, surrounded by said housing, and bottomed on said closed end of the housing, said bearing having ports therethrough aligned with the housing ports, said bearing also having plug port conforming relief recesses in the inner wall thereof between the ports thereof to register with the ports of the plug in a closed position of the valve so that the plug engaging inner surface of the bearing will not overlie the plug ports and extrusion of plastics material into the plug ports will be prevented, a closure member in the open end of the housing pressing the stretched bearing against the closed end and the surrounding wall of the housing to compress the resilient stretched material and provide a seal between the plug and housing preventing leakage from the ports and shaft while simultaneously supporting the plug in the housing to control flow between the bearing ports through the plug, the resiliency of the compressed and stretched bearing material taking up wear and a deformed lip on the housing overlying the closure member to fixedly hold the closure member at a depth in the open end of the housing which will develop a predetermined preload on the bearing.

2. A four component valve cock which comprises a housing having an open end, an opposite closed end with a boss providing an inlet port and a plurality of laterally extending bosses between the open and closed ends providing peripheral outlet ports, a valve plug having a hollow full ball end in said housing between the open and closed ends thereof and a stem projecting through the open end of the housing, a rigid but resilient and stretchable one piece plastics bearing having an internal ball seal surrounding the ball end of the plug in full mating relation therewith and having laterally extending passageways registering with said housing ports, said internal ball seat of said plastics bearing having a free state size smaller than said ball end of the plug and being stretched by said plug into said full mating relation therewith, a closure member in the open end of the housing having a slot receiving the stem of the plug therethrough and guiding the stem so that the plug can tilt in one plane, said closure member being pressed into the open end of the housing against said bearing to a depth in the housing compressing the stretched bearing and creating a desired preload on the bearing, said stretched and compressed bearing having internal stresses urging the bearing back to its free state size and thereby maintaining a tight fit of the bearing with both the plug and bearing, a portion on the housing overlying the periphery of the closure member to maintain the member fixedly at said depth, ports in the ball end of said plug radiating from the hollow interior thereof and positioned so that tilting of the plug opens and closes the inlet port and rotation of the plug selectively joins the inlet port with an outlet port through the hollow interior of the ball end of the plug, and the resiliency of the preloaded and stretched bearing taking up wear.

3. A four component fluid control valve which comprises a rigid housing having an open end, a closed end, and a plurality of housing ports, a rigid but stretchable and resilient hollow plastics bearing in said housing surrounded by said housing and bottomed on said closed end and having bearing ports registering with said housing ports, a rigid plug having a hollow portion in said housing of larger external size than the free state interior of the hollow plastics bearing enveloped by and stretching said plastic bearing with plug ports selectively joining the hollow portion thereof with the bearing ports and a shaft portion extending from the hollow portion out of the housing, a closure member in the open end of the housing pressing the bearing against the closed end of the housing and against the surrounding wall of the housing to compress the bearing and provide a seal between the plug and housing preventing leakage from the ports and shaft and simultaneously supporting the plug in the housing to control flow between the housing ports through the plug, and a lip means on the housing overlying the closure member and holding the closure member at a depth in the open end of the housing which will compress the stretched bearing and develop a predetermined preload on the bearing, and said stretched and compressed bearing having internal stresses attempting to regain its free state condition to contract around the plug and expand against the housing and closure member.

4. A four piece valve cock which comprises an as cast metal housing having an axial open end and laterally extending bosses providing housing ports, a hollow cold formed metal plug in said housing having plug ports adapted to selectively register with said housing ports and a shaft portion projecting from the housing, a rigid but resilient and stretchable plastics material bearing member in said housing stretched over and enveloping said hollow plug and surrounding the shaft of the plug, said bearing having bearing ports permanently registering with said housing ports and selectively registering with said plug ports, a metal closure disc pressed into the open end of said housing against said bearing to a depth creating a desired compression preload on the bearing, means on said housing overlying the closure disc for maintaining said depth in the housing, and said stretched and compressed bearing having internal stresses attempting to regain the free state of the bearing to contract around the plug and expand against the housing and closure disc while supporting the plug for movements controlling flow through the plug between the housing ports and simultaneously sealing the plug and its shaft to prevent leakage out of the housing.

5. The valve of claim 3 wherein the plug is a cylinder having a closed end from which the shaft extends, an open opposite end, and diametrically opposite ports in the side wall thereof, and the bearing is a cylinder having ends overlying both ends of the plug and ports in the side walls registering with the housing ports.

6. The valve of claim 3 wherein the plastic bearing has plug port conforming relief passages in the inner wall thereof between the ports to register with the ports of the plug in the closed position of the valve so that no plastics material will extrude into the plug ports.

7. The valve cock of claim 4 wherein the plastic bearing provides a ball seat and the plug has a hollow ball portion supported on said seat with a stem portion extending through the bearing beyond the housing.

* * * * *